US008818859B1

(12) United States Patent
Bouthillier (10) Patent No.: US 8,818,859 B1
(45) Date of Patent: Aug. 26, 2014

(54) SYSTEM AND METHOD OF MANAGING ADVERTISEMENTS AND PAYMENT OF CONTENT

(75) Inventor: Robert J. Bouthillier, Lincoln, RI (US)

(73) Assignee: Design Net Technical Products, Inc., Smithfield, RI (US)

(*) Notice: Subject to any disclaimer, the term of this patent is extended or adjusted under 35 U.S.C. 154(b) by 75 days.

(21) Appl. No.: 13/085,031

(22) Filed: Apr. 12, 2011

Related U.S. Application Data (60) Provisional application No. 61/322,987, filed on Apr. 12, 2010.

(51) Int. Cl.
G06Q 30/00 (2012.01)
G06Q 30/02 (2012.01)

(52) U.S. Cl.
CPC ........ G06Q 30/0257 (2013.01); *G06Q 30/0251* (2013.01); *G06Q 30/0255* (2013.01)
USPC ................... 705/14.55; 705/14.49; 705/14.53

(58) Field of Classification Search
USPC ...................................................... 705/14.49
See application file for complete search history.

(56) References Cited

U.S. PATENT DOCUMENTS

2008/0010120 A1* 1/2008 Chung et al. .................... 705/14
2009/0271273 A1* 10/2009 Bettinger .................... 705/14.68

OTHER PUBLICATIONS

Anderson, "P2P traffic drops as streaming video grows in popularity", Ars Technica, Sep. 2, 2008, on line at arstechnica.com/uncategorized/2008/09/p2p-traffic-drops-as-streaming-video-grows-in-popularity.*
clixsense.com (front page of website), retrieved Mar. 26, 2014.*

* cited by examiner

*Primary Examiner* — John G Weiss
*Assistant Examiner* — Scott C Anderson
(74) *Attorney, Agent, or Firm* — Salter & Michaelson (57) ABSTRACT

A system and method for managing video sequences and the payment of content online, including an application programming interface (API). The API allows creators of advertisements, sponsors of advertisements, providers of content, and viewers of the advertisements and the content to interact. The system facilitates interaction of the parties to allow users to access content from a content provider in exchange for the user viewing an advertisement that is created by an ad-creator and sponsored by an ad-sponsor. The method receives a request for payment of content, transmits a list that includes a plurality of links to advertisements, transmits an advertisement of interest to the user, and then authorizes payment of the content to the content provider. The system also allows advertisers to reach an ideal audience as users select the advertisements having a particular product or service with which the user is interested.

25 Claims, 10 Drawing Sheets

Member Access Permissions

| | Gratitube Web Server | Member Account Information | GTVideo Inventory | Post GTVideo | Sponsor GTVideo | GTVideo Statistics | GTVideo Presentation API |
|---|---|---|---|---|---|---|---|
| Ad-viewers | ✓ | ✓ | ✓ | | | | |
| Ad-creators | ✓ | ✓ | ✓ | ✓ | | | |
| Ad-sponsors | ✓ | ✓ | ✓ | | ✓ | ✓ | |
| Content providers | ✓ | ✓ | ✓ | | | ✓ | ✓ |

SYSTEM AND METHOD OF MANAGING ADVERTISEMENTS AND PAYMENT OF CONTENT

RELATED APPLICATION

The present application claims priority to U.S. Provisional Application Ser. No. 61/322,987 filed on Apr. 12, 2010. The content of all of the aforementioned application is hereby incorporated by reference herein in its entirety.

TECHNICAL FIELD

The present invention relates to methods for advertising products and services to customers.

BACKGROUND OF THE INVENTION

Traditional television and internet-content-sponsoring advertising models rely upon presenting interruptive advertising to viewers, quite often to poorly-targeted audiences. Research has shown that ads presented in this format have little impact and that an ad presented outside of the context of a program it interrupts, has virtually no impact at all.

However, there is another form of television advertising known as Product Placement or contextual advertising where a product is shown in use within the storyline of a program, and this has been proven to be quite effective.

There is a need for a system for presenting an ad in a standalone or an interruptive fashion with the effectiveness of the Product Placement ad.

SUMMARY OF THE INVENTION

To accomplish the features of the present invention there is provided a system that improves upon the prior art in several ways. It has a focus on peer-generated recommendations rather than on advertising generated by or on behalf of firms with an ownership interest in the product presented. Additionally, it establishes a repository of traditional commercial advertisements and these peer-generated recommendation Graditube Videos (GTVideos) indexed by a database that links every GTVideo to an instance of a product or service. Viewer Control is desirable to allow viewers to set ad preferences to match their interests and allow them to choose which GTVideos to view. Finally, it should provide a vehicle to permit the owners of a Product or Service to sponsor a GTVideo—which ultimately compensates both the GTVideo creator and the GTVideo viewer for each unique viewing.

The advertisement system catalogues an inventory of Graditube Videos and providing appropriate advertisements to a particular viewer. The system allows viewers to view an advertisement in exchange for payment for particular content they are seeking on the internet. Advantageously, the system also allows advertisers and sponsors thereof to target their advertisements for an audience who has a particular interest in a product or service. This system includes an electronic database that can be accessed by members including ad-creators, ad-sponsors, GTVideo viewers, and content providers, said electronic database containing information to authenticate members and to track and execute transactions, means of ensuring secure access to said electronic database, and means for identifying one or more enrolled member accounts in said electronic database.

The advertisement management is provided as a SAAS (software as a service) system which connects advertisers for a product or service with ad-creators, ad-sponsors and end-customers, while enabling end-customers (viewers of the ad) to obtain content for free in exchange for viewing the ad. This system encourages both novice and professional ad-creators to create and post video accolades that express their praise for a product or service. The system uses a database structure to create a catalog of video advertisement "instances" called "GTVideos". Once a GTVideo is posted and a product or service sponsors it, payments will be made to the ad-creator and on behalf of the viewer each time the GTVideo is viewed. The sponsor of the ad provides funds so that the ad-creator can be compensated, and additionally funds can be provided to content providers so that viewers of the ads are provided with the content in exchange for viewing the ad. GTVideos are categorized and are delivered to Internet audiences according to their interests or as defined by their preferences.

In accordance with other aspects of the present invention, database transactions include, a process for ad-creators to post GTVideos, a process for ad-sponsors to view posted GTVideos, a process for ad-sponsors to sponsor GTVideos, and a process for public to view and filter GTVideos.

The present invention also relates to a process for an ad-sponsor to sponsor a posted GTVideo comprising the steps of: viewing a GTVideo that has been linked to one of their product instances, confirming their desire to sponsor the GTVideo, posting funds or a guarantee for funds in their account to sponsor the GTVideo, and assigning the GTVideo to a category in the database.

In accordance with the other aspects of the present invention, there is an interface for a GTVideo viewer to watch GTVideos, including sponsored GTVideos. Viewers who watch sponsored GTVideos will enjoy receiving payment for part or all of their paid programming from the GTVideo sponsor. GTVideos often provide purchasing information, which may include product/service cost and availability through online and local retail outlets or direct links to facilitate the viewers' purchase of the product.

BRIEF DESCRIPTION OF THE DRAWINGS

Other objects, features and advantages of the invention shall become apparent as the description thereof proceeds when considered in connection with the accompanying illustrative drawings in which.

DETAILED DESCRIPTION

A context-sensitive advertisement system provides videos to viewers based upon a recommendation, such as a peer-generated recommendation, and/or viewer preferences to match viewer interests. FIG. 1A is an overview block diagram of a system for cataloging a database of advertisements and providing context-aware advertisements to particular viewers.

The advertisement management system has several advantages which will be apparent upon reading the following detailed description. The advertisement system connects viewers of advertisements directly with sponsors of an advertisement to allow for targeted advertising. Additionally, the system provides an arrangement where viewers and other end-customers or end-users are able to access content from content providers by viewing an advertisement that is related to a particular product or service which they choose. For example, a user may select an advertisement for a credit card, or for a vehicle of their choice. Sponsors of the advertisement (which may or may not be owners of the particular product or service which the advertisement is related to) provide funds to sponsor the advertisement. These funds are sent in part to the creator of the advertisement, so that they may be compensated for creating the advertisement. The funds are also sent in part to the content provider, the content provider having content which the end-customer wishes to acquire. The user is able to view an ad, by choosing an advertisement related to a product or service which they are interested in, and upon completion of the advertisement, the content provider is compensated from funds provided by the sponsor of the advertisement. This allows sponsors and advertisers to specifically target their audience for users who are particularly interested in a product or service. While the growth of the internet has presented many different modes of advertising to viewers and to content providers, this implementation is the first to present an interactive environment for viewers, advertisers, ad-creators and sponsors in a one place. Refer to FIGS. 9 to 12 for diagrams of exemplary screen displays of an interface of the advertisement system in accordance with an operative embodiment of the present invention.

Figure 5:
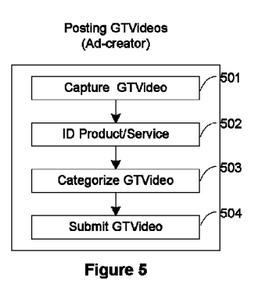
FIG. 5 is a flow chart of a procedure for posting a video to the system server by an ad-creator, in accordance with the illustrative embodiment.
Figure 6:
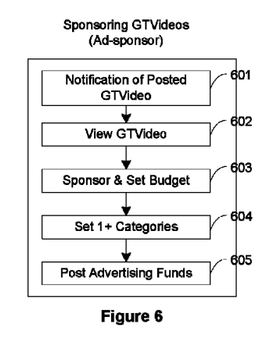
FIG. 6 is a flow chart of a procedure for sponsoring a video from the system server by an ad-sponsor, in accordance with the illustrative embodiment.

GTVideos are conventional commercial advertisements or customer-created, context sensitive video advertisements or other appropriate media files, such as a message sent to a phone or other device using a multimedia message service, that customers of products or services create and post to the Graditube Web Server Database. The Graditube database uses product identification methods, such as a web-search or UPC/SKU look-up to ensure that GTVideos are correctly associated with specific product instances. FIGS. 5 and 6, described below, detail the procedures for posting and sponsoring videos, respectively.

System Access

Reference is now made to FIG. 1A showing a secure real-time transaction system for managing context-sensitive advertisements that permits viewers 10, ad-creators 20, ad-sponsors 30 and content-providers 40 to access via a system server 50 a system database 59, comprising a plurality of video sequences ("GTVideos" as used herein) representative of a particular context-sensitive advertisement. The system server of FIG. 1A is built as a secure real-time advertisement transaction system to permit viewers, ad-creators, ad-sponsors and content-providers to access the transaction database on a real-time basis, such as the Graditube system. The system can be implemented in SAAS (software as a service), or can be a server such as a computer, computing device, computing application, or other appropriate hardware, software, or combination of hardware and software, to achieve the functions described herein. FIGS. 1-4 illustrate how ad-creators, ad-sponsors, ad-viewers and content providers, respectively, interact with the Graditube system server.

With reference to FIG. 1A, an ad-viewer 10 provides log-in information via datastream 11 to a network 15. An ad-viewer can be any user that desires to obtain content from a content provider online. The network can comprise any appropriate network for communication between a plurality of devices, such as a local area network (LAN), wide area network (WAN) or the worldwide Internet. The log-in information is transmitted through the network 15 to system server 50 via datastream 51, and confirmation is returned via datastream 52. A viewing application 55 running on the system server 50, as described in the procedure of FIG. 3, which allows viewers to perform various features within the system. The confirmed ad-viewer log-in offers additional options to viewers in addition to the anonymous access to videos in a system database via datastream 12. The ad-viewer 10 also submits preferences via datastream 11 to retrieve videos 12 that are content-specific to their preferences, as well as peer-recommended preferences that determine which videos are transmitted to the viewer via datastream 12. The ad-viewer 10 is able to view content from a content provider without having to pay a fee, by instead viewing an advertisement which is sponsored, so that the funds from the sponsor are sent to the content provider, as described in greater detail herein.

An ad-creator 20 also submits log-in info to the network 15 via datastream 21. The ad-creator can further transmit advertisements they have created and other videos via datastream 21. The videos are transmitted to the system server 50 via datastream 51 to be downloaded in the system database 59. A creation application 56 running on the system server 50, as described in the procedure of FIG. 1, describes the various features available for an ad-creator within the system. The ad-creator 20 obtains revenue via datastream 22 for the videos they have created in accordance with an illustrative embodiment.

An ad-sponsor 30 transmits log-in info to the system via datastream 31. The ad-sponsor 30 can comprise any entity that desires to sponsor an advertisement, and they receive queries for sponsoring an advertisement or video via datastream 32. The ad-sponsor confirms sponsorship via datastream 31 and transmits revenue via datastream 31 into the system network 15. This information is transmitted to the system server via datastream 51 to be manipulated by the sponsor application 54 which performs the procedure of FIG. 2 for a sponsor in accordance with the illustrative embodiment. The funds provided by the ad-sponsor are used to pay the creator of the advertisement as well as the content provider, such that the content can be provided to the viewer in exchange for the viewer interacting with (i.e. viewing or otherwise engaging the video or other data file) the advertisement.

A content-provider 40 transmits log-in info, as well as content for distribution including demographic market data related to the content, into the system via datastream 41. The content provider is a provider of a particular product or server that can be the content of a particular advertisement or other video sequence, or can be any content provider from which an ad-viewer is seeking content. The content can be music, applications for a computer or phone, IPTV (Internet Protocol Television) programs, movies or games, among other content available from content providers. Users seeking the content can be using any number of devices, including a cell phone, a smart phone, a tablet, a laptop or other personal computer, or a television set top box. The content provider retrieves video history 42, showing a history of transactions for various other members within the system, particularly viewers, and the particular videos containing their particular product or service. The video history is generated by a content provider application 57 running on the system server 50 that reviews videos viewed by a particular viewer to create a video history. This is transmitted via datastream 58 to the system database 59 for storage, and video histories are transmitted via datastream 52 to the network 15 to be returned to the content provider 40 via datastream 42.

Figure 7:
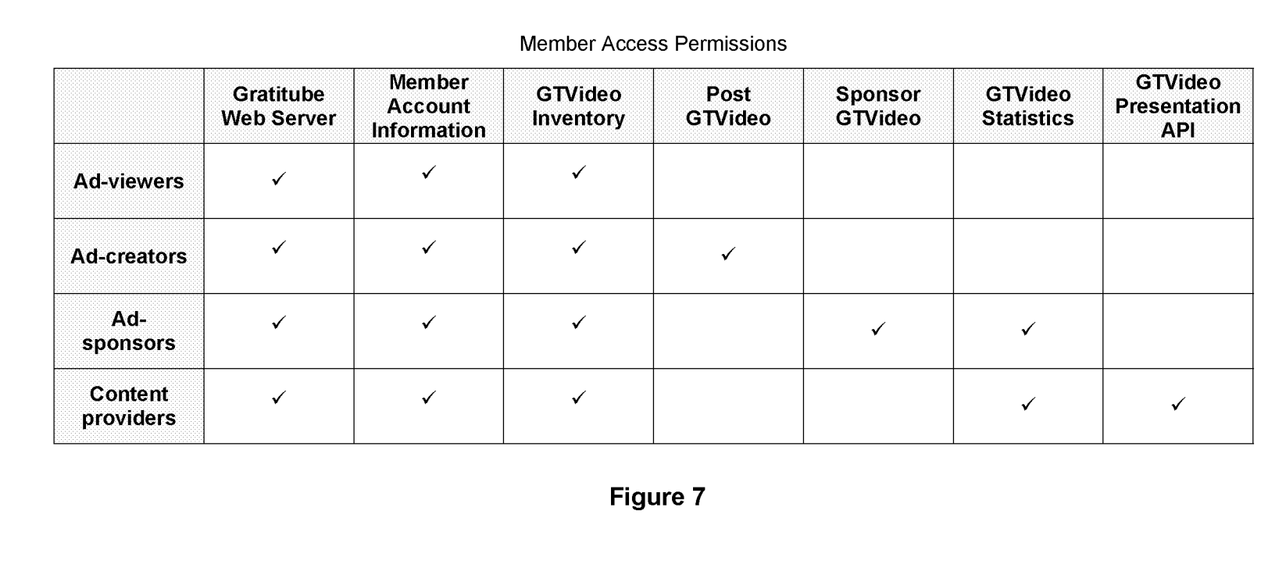
FIG. 7 is a table illustrating exemplary system member access permissions, in accordance with the illustrative embodiment.

The table in FIG. 7 summarizes member access permissions in accordance with the illustrative embodiment. In accordance with an illustrative embodiment, ad-viewers have access to the system server, their account information and the entire ad inventory. Ad-creators have access to the web server, their account information, their inventory information, the entire ad inventory and can post GTVideos. Ad-sponsors have access to the web server, their account information, and the entire ad inventory, but they are also accessible to select an ad and sponsor it by posting it "for sale" with a specified max number of "imprints" for which payments will be made to the ad-creator and on behalf of the ad-viewer. Ad-sponsors also may view ad-statistics which may provide demographic information about where, when and how the ad was viewed. Content-providers have access to the web-server, their account information, the entire ad inventory, ad-statistics and to an Application Programming Interface (API) that allows them to present an offer for a Graditube Advertisement to the ad-viewer before, during or after a program.

Database Format

The system server database 59 stores information as a database of "instances" of each product or service including a unique product identifier such as a Product Description, SKU, ISBN or Manufacturers Part Number, and each ad-creators' GTVideo references one or more of these "instances" to form the GTVideo record.

Ad-Creator Access

Figure 1:
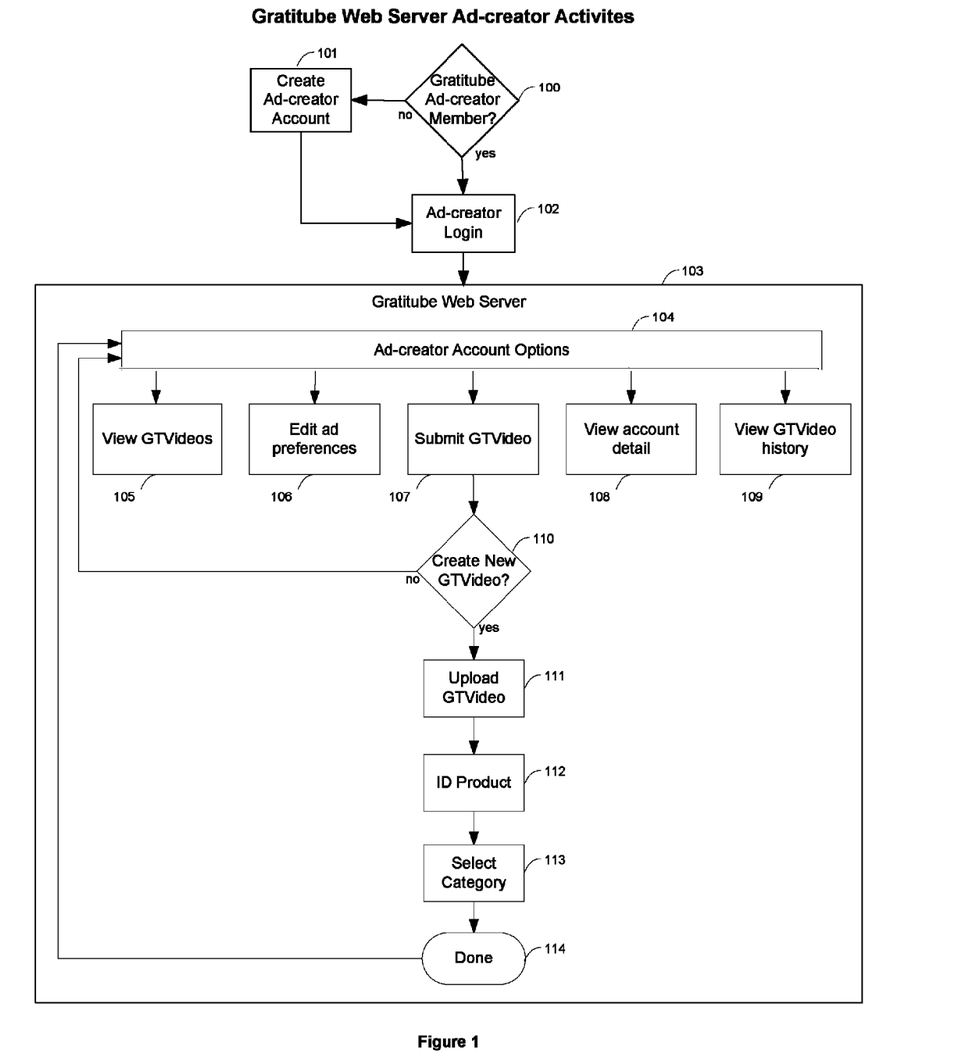
FIG. 1 is a flow chart of a procedure for an ad-creator performing member activities in accordance with the illustrative embodiment.
Figure 1A:
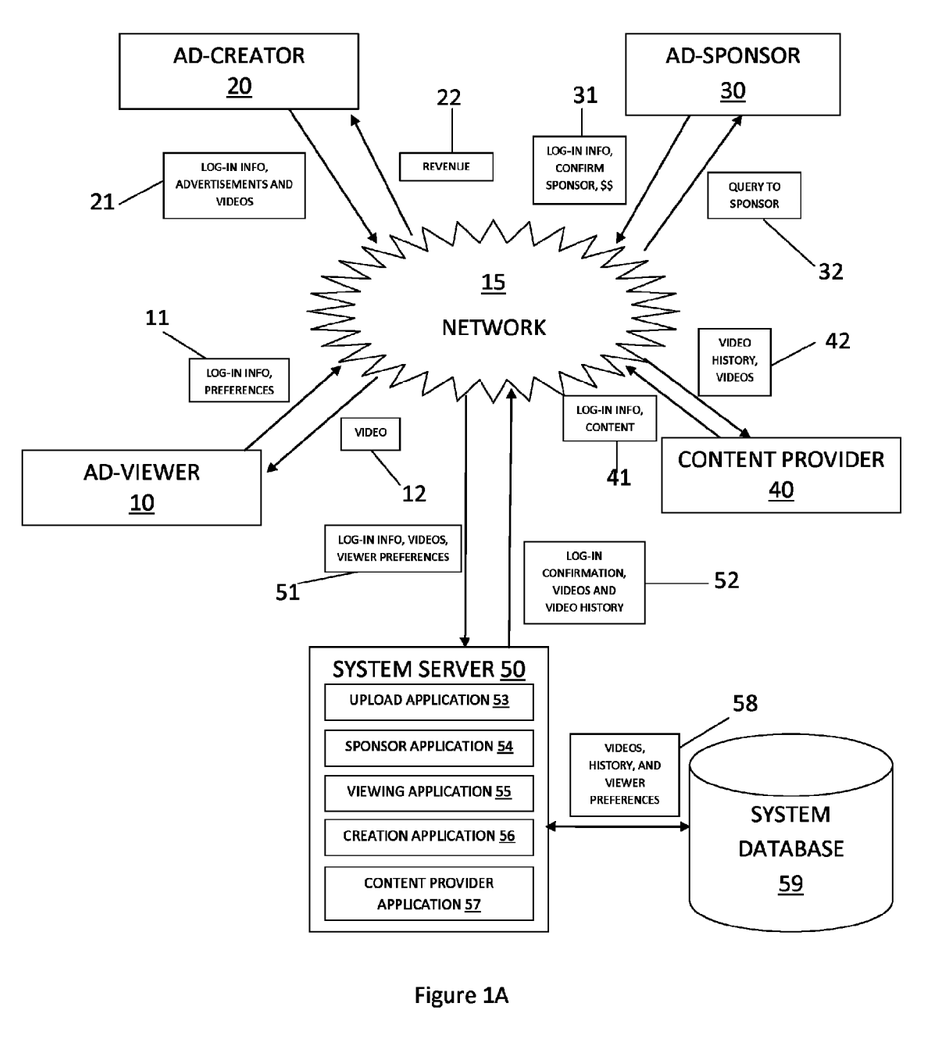
FIG. 1A is an overview system block diagram of a context-sensitive advertisement system for cataloging a database of advertisements and providing context-sensitive advertisements to particular viewers, in accordance with an illustrative embodiment.

FIG. 1 illustrates a procedure for the activities performed by an ad-creator using the creation application on the system server. The Graditube System initiates at decision step 100 by determining if an ad-creator is a member. If not, the system prompts ad-creators to create an account at step 101 using information that may be used to authenticate an ad-creator. This information may include name, address, date of birth, social security number, business ID and the like. One or more deposit accounts such as a PayPal account, a Graditube account or a Debit Card Account is required if the ad-viewer wants to receive payments from ad-sponsors. Ad-creators then login at step 102 to the Graditube web server at step 103 to access the ad-creator account options at step 104. Ad-creators are able to view any GTVideo 105 and may post GTVideos to the database at step 107. To submit a GTVideo, the ad-creator:

(a) Create the GTVideo at step 110
(b) Upload the GTVideo to the Graditube Database at step 111
(c) Identify the Product or Service, for example by scanning a product barcode or including the product website (e.g. sales@xyz.com, info@xyz.com) or by another identification at step 112. If this is a new instance, after step 112 the system determines if it is a new instance and creates a new instance before continuing to step 113.
(d) Select an intended category for the GTVideo (For Example Cooking, Auto, etc) at step 113. The procedure is done at step 114 and returns to options at step 104.

Ad-creators view account details at step 108 and also have access to GTVideo history at step 109, which can include statistical information about when, where and how the GTVideos have been viewed, what categories it has been assigned to by sponsors, and financial information about their sponsored inventory.

Ad-Sponsor Access

Figure 2:
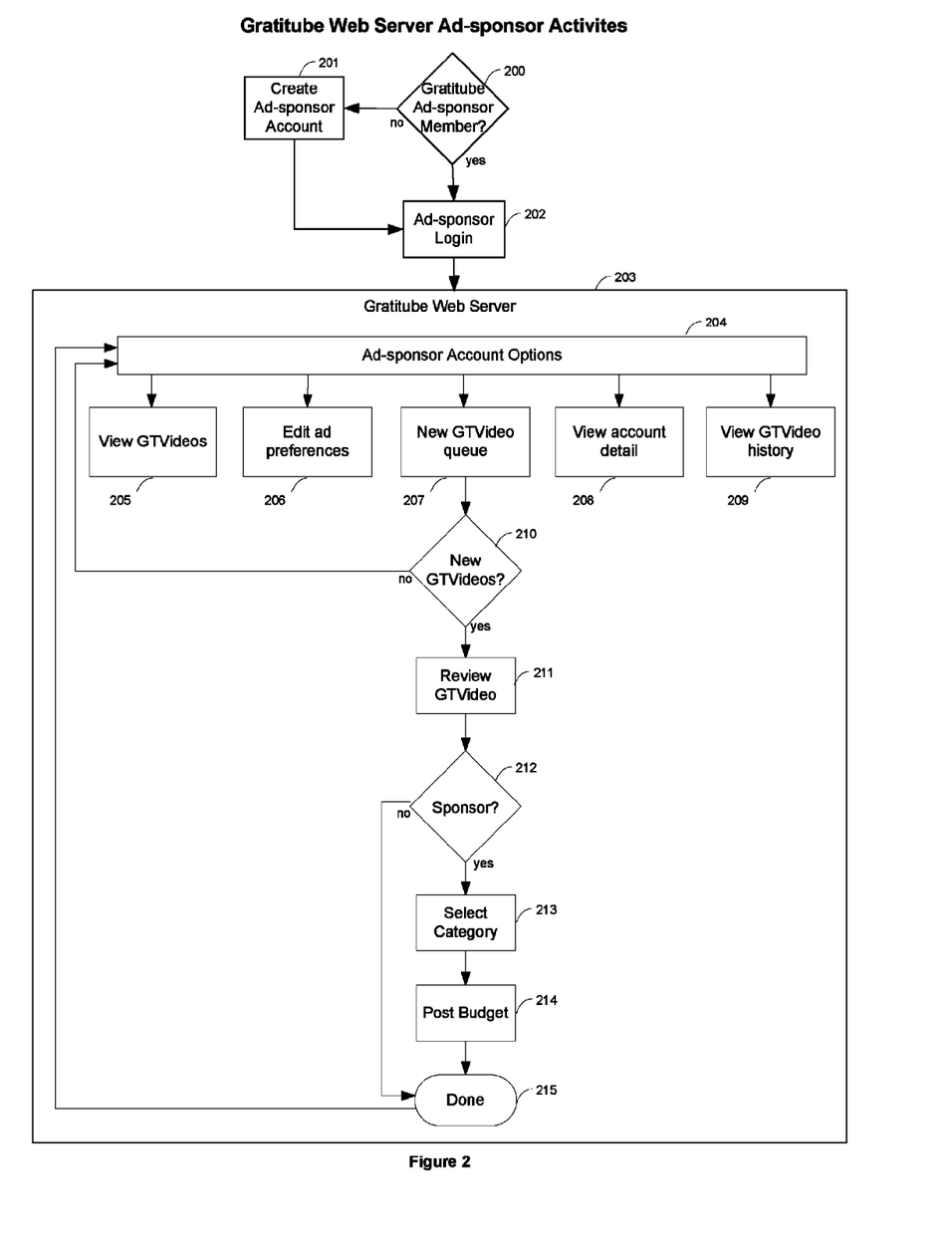
FIG. 2 is a flow chart of a procedure for an ad-sponsor performing member activities in accordance with the illustrative embodiment.

FIG. 2 illustrates a procedure for the activities performed by an ad-sponsor on the Graditube web server. The Graditube System initiates at decision step 200 by determining if an ad-sponsor is a member. If not, the system prompts ad-sponsors to create an account at step 201 using information that may be used to authenticate an ad-sponsor. This information may include name, address, date of birth, social security number, business ID and the like. One or more Payment accounts such as a PayPal account, a Graditube account a Credit or Debit Card account or a checking account are required to sponsor an ad-creator's GTVideo. Ad-sponsors typically have an ownership interest in at least one product represented in a GTVideo to sponsor the video. Ad-sponsors login at step 202 and are directed to the system server at step 203 to access the ad-sponsor account options at step 204. Ad-sponsors are permitted to view GTVideos at step 205 and can set their ad preferences at step 206 for notification whenever the status of a GTVideo relating to a monitored Product or Service changes. This status notification can occur for reasons that include the following:

(a) New GTVideo—A new GTVideo has been posted for their product/service (with their UPC/SKU, etc.)
(b) GTVideo Budget Threshold—A GTVideo they sponsored has reached a view-limit and may need its budget replenished.
(c) Monitored GTVideo—Notification that another GTVideo has reached a view threshold (may be used to monitor effectiveness of competitors' GTVideos.

Ad-sponsors may also check the new GTVideo queue at step 207, view their account detail at step 208 and view their GTVideo history at step 209.

Ad-sponsors who wish to sponsor a GTVideo typically do the following:

(a) Receive notification of a new GTVideo under their SKU at step 210
(b) Review the new GTVideo at step 211
(c) Sponsor Option—If sponsoring is desired, set budget to Sponsor a GTVideo at decision step 212
(d) Set Category—Choose one or more categories to align with ad-viewer user preferences at step 213. Optionally at this step, a user may also select a desired demographic that the sponsored advertisement will be presented to. Also, the user may optionally set one or more time intervals during which the sponsored advertisement will be available to viewers.

(e) Post Advertising Budget—Set budget to sponsor GTVideo and escrow funds for Sponsorship at step 214

The procedure is complete at step 215 and returns to account options.

Ad-Viewer Access

Figure 3:
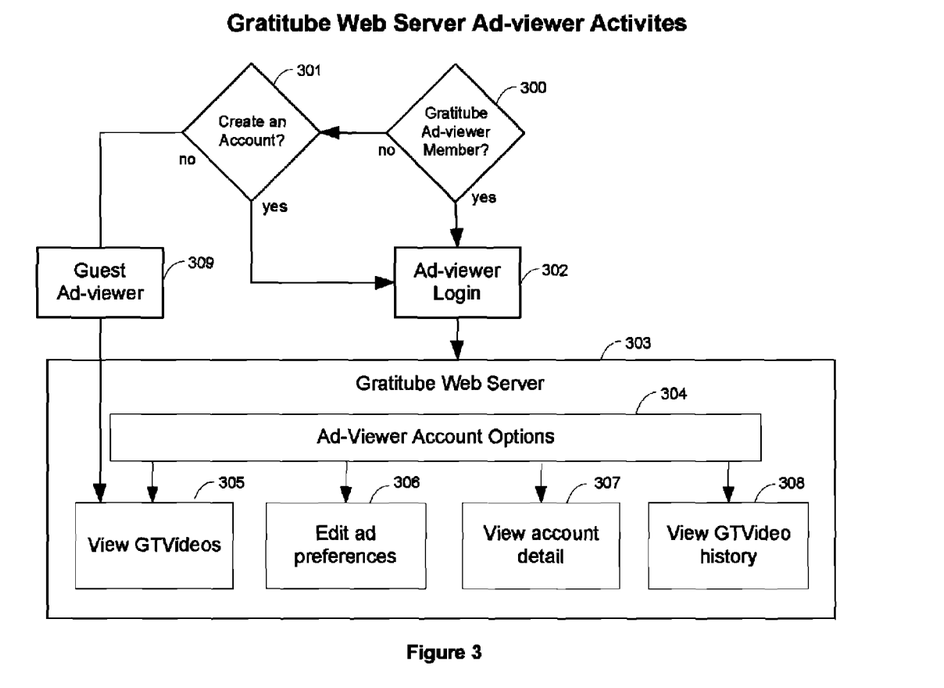
FIG. 3 is a flow chart of a procedure for an ad-viewer performing member activities in accordance with the illustrative embodiment.

FIG. 3 illustrates a procedure for the activities performed by an ad-viewer on the system server. The procedure initiates at decision step 300 by determining if an ad-viewer is a member. If not, the system prompts ad-viewers to create an account at step 301 using personal information that may be used to authenticate an ad-viewer. This information may include name, address, date of birth, and the like. One or more credit accounts such as a PayPal account, a Graditube account or a Credit Card Account is required if the ad-viewer wishes to have access to features that involve the transfer of funds into or out of an ad-viewers' account, or transfer of funds to a content-provider. If viewers do not create an account, at step 309 they access the system as a guest viewer and can view videos at step 305. Guest ad-viewers will only have access to view GTVideos 305; other features of Graditube will not be available without creating an account.

Ad-viewers login at step 302 to the web server at step 303 to access the ad-viewer account options at step 304:

(f) View GTVideos at step 305
(g) Edit ad preferences at step 306
(h) View account detail at step 307
(i) View GTVideo history at step 308

Ad-viewers may set preferences at step 306 that include their general interests such as Cooking, Pets or Autos, and they may set specific interests as well, such as SUV, VOLVO or Laptop if they have a specific interest area. Ad-viewers may watch a GTVideo as often as they wish, but may only receive compensation, in the form of content from the content provider, for a specific GTVideo once. Examples of the use of this system include the following:

Use of Widgets

Allows users to watch a GTVideo on-demand by selecting (see FIG. 8 for example) the GTVideo Widget 801 on their screen 800 (such as a television, monitor, computer display, cell phone display etc.). This can be done if the viewer desires to have funds posted to their registered payment account (PayPal, Debit Card Account, Graditube Account) account prior to watching a program that requires payment but does not offer GTVideos (ex: iTunes, Amazon, Blockbuster Online)

Watching GTVideos

Figure 8:
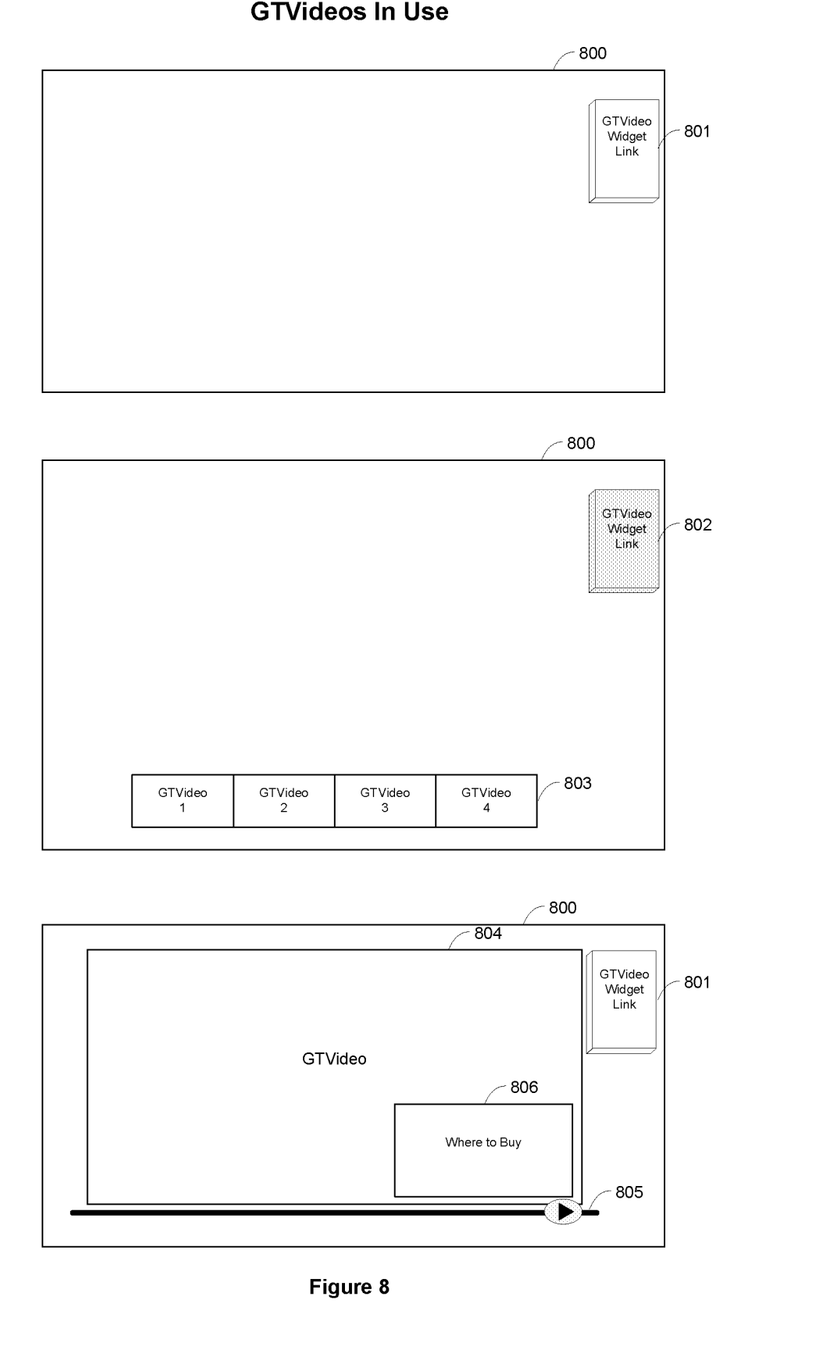
FIG. 8 is a diagram of an exemplary screen display for a GTVideo viewer selecting a GTVideo to pay for part or all of their paid content.
Figure 9:
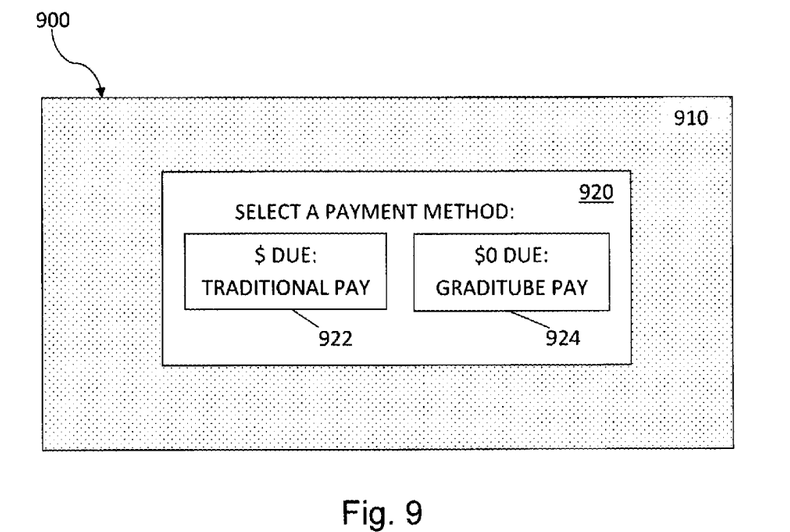
FIG. 9 is a diagram of an exemplary screen display of a content provider screen including a payment box for selecting a payment method to obtain content from the content provider, in accordance with the illustrative embodiment.
Figure 10:
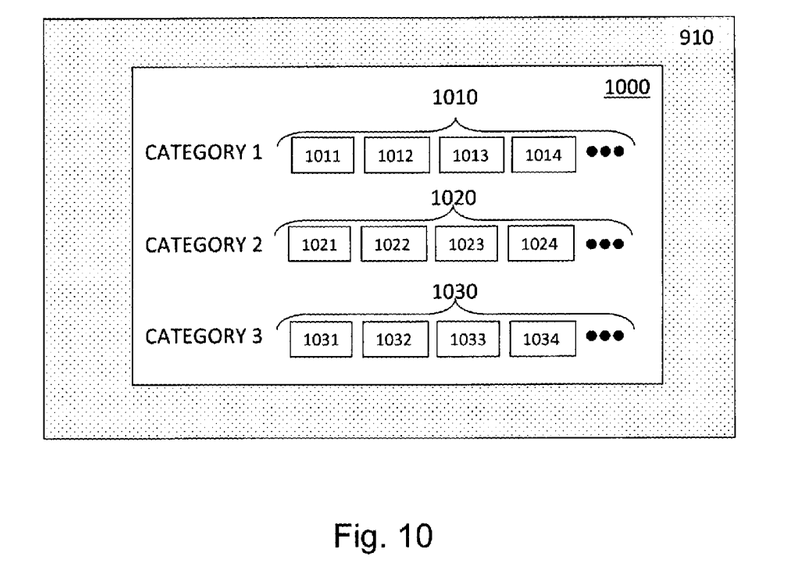
FIG. 10 is a diagram of an exemplary screen display of various categories of ads available for viewing to obtain content from the content provider, in accordance with the illustrative embodiment.

Once the GTVideo Widget is active 802, the GTVideo menu 803 can be used to select a GTVideo to watch. GTVideos may be viewed at any time as often as desired. However, compensation related to a GTVideo can be limited so that it will be made only once per user and may also be limited by address or household.

Where to Buy

Figure 11:
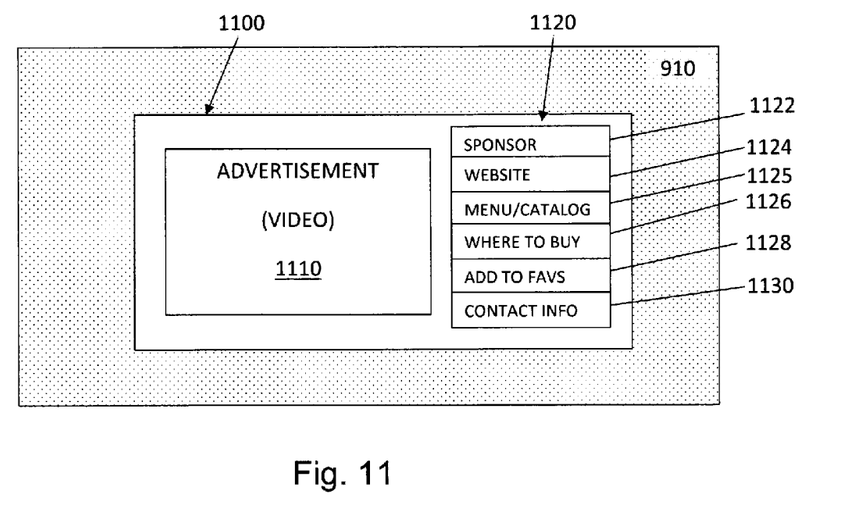
FIG. 11 is a diagram of an exemplary screen display of an advertisement video and corresponding options for a product or service related to the video, in accordance with the illustrative embodiment.

After the GTVideo plays at 803, a dialog box, for example box 1126 as shown in FIG. 11 and described in greater detail hereinbelow, is presented to the ad-viewer to notify them where to buy the product or service and it may optionally include local and web pricing information. This permits the viewer to purchase the item and they can even have the purchase posted to their purchase account.

Ad History

A history 308 of recent GTVideos is maintained in the ad-viewer's account to permit review or access to the Where to Buy purchase dialogs 806 and links after the initial viewing.

Content Provider Access

Figure 4:
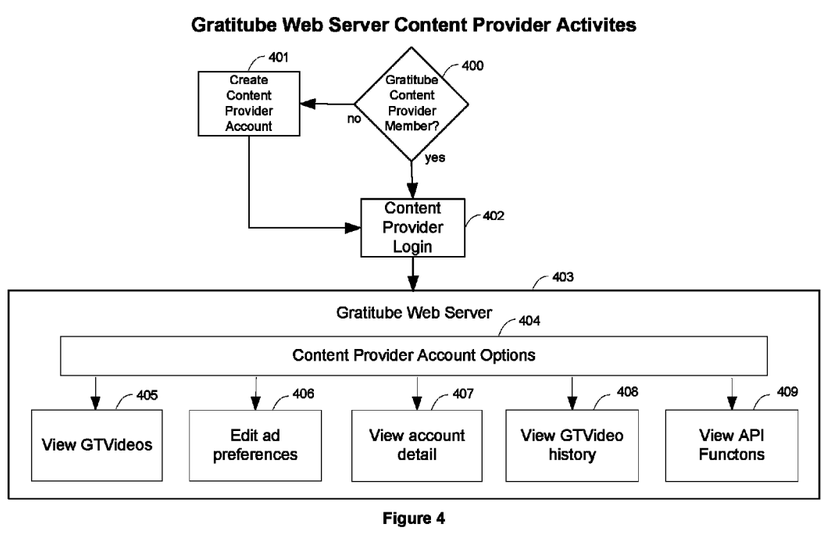
FIG. 4 is a flow chart of a procedure for a content-provider performing activities in accordance with the illustrative embodiment.

FIG. 4 illustrates a procedure for the activities performed by a content-provider on the system server 403. The Graditube System initiates at decision step 400 by determining if a content-provider is a member. If not, the system prompts content-providers to create an account at step 401 using information that may be used to authenticate the Content-Provider. This information may include name, address, date of birth, social security number, business ID and the like. One or more deposit accounts such as a PayPal account, a Graditube account or a Debit Card Account is required if the content-provider wants to receive payments from ad-sponsors. Content-providers login at step 402 into the Graditube system server at step 403 to access their account options at step 404. Content-providers are able to view any GTVideos at step 405. The content providers can edit ad preferences at step 406, view account detail at step 407 and view the video history at step 408. Content providers may use our Application Programming Interface (API) 409 to auto-generate a menu of GTVideos for one of their viewing clients. In this instance, the API can present a menu of thumbnails or previews of one or more sponsored GTVideos that match the viewers' Graditube interest preferences. Once the viewer makes a selection, the funds are escrowed and the GTVideo begins to play. The viewer can be presented with options such as product cost, and where to purchase from local and web merchants. Upon completion of the GTVideo, ad-viewer statistics are returned along with the transfer of funds from the ad-sponsor's escrow account to the content-providers' account.

FIG. 5 illustrates how an ad is posted by an ad-creator to the GTVideo database: an ad-creator captures a GTVideo 501, identifies the product or service in the GTVideo 502, categorizes the GTVideo 503 and submits the GTVideo for review 504. FIG. 6 illustrates how an ad is sponsored by an ad-sponsor: an ad-sponsor is notified of a GTVideo ad matching their preferences 601, views the GTVideo 602, sets a budget to sponsor the GTVideo 603, assigns the GTVideo to one or more categories 604, and posts the advertising funds 605.

Operational Embodiment

Reference is made to FIGS. 9-12, illustrating exemplary screen displays according to an operational embodiment of the advertisement system. A user or viewer accesses a screen display 900 from a content provider. The content provider screen display 900 may be a website display, a screen display on a phone from an application, or another appropriate display on a device. The screen 910 is the content that the user desires to obtain, which can be music, movies, applications for computers or other devices, television programs, games, or other content available from content providers. Once a user selects the content 910 which they are interested in, the user is typically presented with a payment box 920 which allows a user to select their method of payment to obtain the content. A user can pay for the content in a traditional manner, by selecting the payment box 922. A user also has the option of not paying for the content, by instead viewing an advertisement by selecting box 924, to interact with the advertisement system (i.e. Graditube) as described herein.

According to the illustrative embodiment, there are several options for engaging the advertisement system to establish communication between the parties such that the content provider is paid for the content, the viewer is able to obtain the content without paying the traditional cost for the content, and finally advertisers are able to specifically send advertisements to viewers having an interest in their product or service. The application programming interface of the advertisement system can be initiated by either the content provider or the end-user. A content provider launches the application as a payment vehicle through the advertising system. Once the viewer selects and ad, the application reports the dollar value that will be paid to the content provider. The content provider continues to use the application of the advertisement system to track the progress of the advertisement and thus they are notified when the advertisement completes and the payment has been transferred to their payment-receipt account. The content providers use the application of the advertisement system to close the advertisement and begin delivering their content.

In a further embodiment, the end-user can initiate interaction with the advertisement system by using a widget or link. Under this model, the user has a payment-receipt account, they launch the app, and when the ad completes, a variable amount of funds are transferred to their payment-receipt account (such as PayPal, Graditube, etc). Accordingly, content providers who offer Graditube are guaranteed the full payment amount for an advertisement while individual users are only offered randomized amounts for watching an ad if they have selected it using our Ad-widget. This is done to reduce abuse by users staying home and clicking on ads all day long.

A user selecting the payment box 924 is directed to a screen display 1000 of the application provided by the advertisement system which provides users with a number of categories of products or services. Each advertisement provided is related to a particular product or service. For example, there is provided CATEGORY 1 which can be a plurality of advertisements 1010 pertaining to games, for example. There is a plurality of links to advertisements 1011, 1012, 1013, 1014, up to any number of available advertisements for the particular category. The term link as used herein includes any graphical representation corresponding to a data file, such as a hyperlink or URL (uniform resource locator) link, as well as other linking capabilities readily apparent to those skilled in the art. Similarly, there are a number of advertisements 1020 for CATEGORY 2 which each include an advertisement 1021, 1022, 1023, 1024, and up to any number of advertisements, for each of a different product or service within CATEGORY 2. CATEGORY 2 could be advertisements relating to automobiles, for example. Also shown in FIG. 10, there can be a third category of advertisements 1030 for CATEGORY 3 which can be, for example, music videos, and can include advertisements 1031, 1032, 1033, 1034, and up to any number of advertisements related to CATEGORY 3. Any number and type of categories are expressly contemplated, the categories being organized by the system server or in accordance with user preferences to provide a number of categories and a number of advertisements for a particular product or service within that category.

Once a user selects a particular category and product or service, a display box 1100 as shown in FIG. 11 is provided to the user. The display 1100 includes the advertisement 1110, which can be a video or other appropriate data file. There can also be provided an options box 1120 which provides users with a number of options related to the product or service of the advertisement 1110. The options box 1120 includes a section 1122 for the sponsor to provide their information. The sponsor website is also provided in section 1124. Note that the sponsor can have an interest in the product or service that is related to the advertisement, or can be an unrelated party. Where the sponsor is the owner or otherwise has an interest in the product or service of the advertisement, the website 1124 will also provide the user with the website for the product or service. Where the sponsor is not related to the product or service, the website may be for the sponsor of the advertisement. There can also be provided a section 1126, as described hereinabove, which provides users with information of where to buy the product or service that is related to the advertisement. This readily provides users with information needed to purchase the product or service. The user is also provided with the option 1128 of adding the product to favorites, so that it can be accessed easily in the future as a favorite product and/or advertisement. The options box 1120 can also include contact information 1130 for obtaining information about the product or service related to the advertisement 1110.

Figure 12:
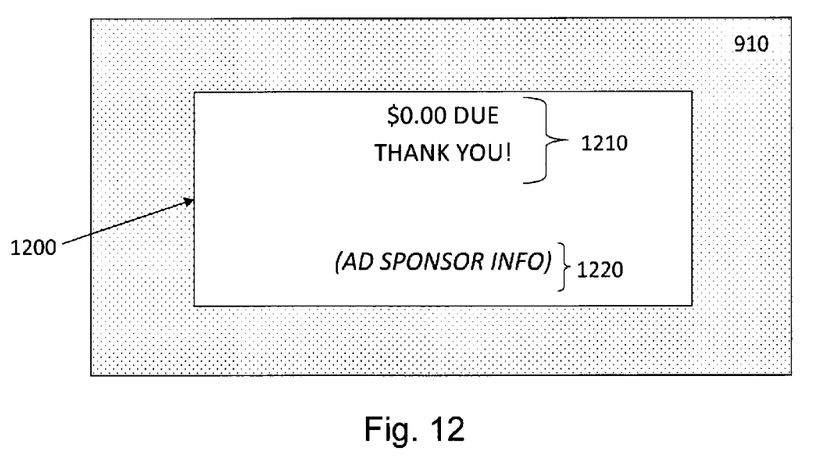
FIG. 12 is a diagram of an exemplary screen display for a message from the sponsor upon completion of the advertisement video, in accordance with the illustrative embodiment.

Upon completion of interaction with the advertisement 1110, which can include a user simply waiting for the video to finish with no other interaction, a user is provided with a message box 1200 as shown in FIG. 12. This message box 1200 provides users with a message 1210 that shows the amount due for the content (which will be $0.00), and also a message, such as the "Thank You!" shown in FIG. 12. The sponsor can also provide sponsor information 1220 in the message box 1200 to show the sponsor that has allowed the viewer to access content without having to pay, by viewing the advertisement.

The exemplary screen displays are for illustrative purposes only and any modifications or changes thereof within ordinary skill will be readily apparent. For example, the shape, style, positioning and arrangement of boxes and components of the various screens can be varied in accordance with personal style and preference to achieve the purposes described herein.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the system and method of the present invention, what has been described herein is merely illustrative of the application of the principles of the present invention. For example, the members of the placement of applications and tasks within the system is highly variable and can be assigned to the client and/or server as desired for desired system functionality. Also, a server as used herein can be a computer, computing device, computer application or other appropriate hardware, software, or combination of hardware and software elements to achieve server functions as described herein. Accordingly, this description is meant to be taken only by way of example, and not to otherwise limit the scope of this invention.

What is claimed is:

1. A computer-implemented method of compensating a content provider for providing content to a viewer, comprising the steps of:
   creating a video file by an ad-creator using a computing device;
   storing the video file into a computer database of video files stored on a system server;
   the database of video files being selectively viewable by at least the viewer;
   viewing a video file by an ad sponsor;
   sponsoring the viewed video file by the ad-sponsor by pledging funds of a selected amount by the ad-sponsor corresponding to the video file;

selecting the content for purchase by the viewer;
selecting, by the viewer, an option to pay by viewing the sponsored video file;
viewing the sponsored video file by the viewer to create a view event;
delivering a portion of the pledged funds by the ad-sponsor to the content provider upon viewing of the view event by the viewer; and
delivering another portion of the pledged funds by the ad-sponsor to the ad creator upon viewing of the view event by the viewer;
whereby, the content provider provides the selected content to the viewer upon receipt of pledged funds that the ad sponsor has transferred to the content provider.

2. The method of claim 1, wherein the step of having the viewer select a video payment option includes alternate options of the aforementioned step of viewing the sponsored video file by the viewer to create a view event to deliver pledged funds and having the viewer directly pay for the selected content.

3. The method of claim 1, including, before the step of having the viewer select a video payment option, initiating a payment option by the content provider.

4. The method of claim 1, wherein the video file is a streaming video file.

5. The method of claim 1, wherein the content is selected from the group consisting of: music, movies, computer applications, television programs and games.

6. The method of claim 1, wherein the viewer reviews the content from the content provider without having to pay a fee, but by instead viewing the sponsored view event, so that the funds from the ad-sponsor are delivered to the content provider.

7. The method of claim 1, wherein the pledged funds provided by the ad-sponsor are used to pay the ad-creator as well as the content provider, such that the content is provided to the viewer in exchange for the viewer interacting with the viewing event.

8. The method of claim 1, including establishing a payment account for the viewer, and providing provision for the transfer of funds to the content provider.

9. The method of claim 1, including establishing a payment account for the viewer, and wherein the viewer receives a credit or funds for viewing the view event.

10. The method of claim 9, wherein the viewer watches a view event multiple times but can only receive once credit or funds in the form of content from the content provider, for a specific view event watched.

11. The method of claim 9, wherein the viewer receives a credit or funds for viewing the view event from the content provider.

12. The method of claim 1, wherein once the viewer selects the content which they are interested in, the viewer is presented with a payment box which allows the viewer to select a method of payment in order to obtain the content.

13. The method of claim 1, wherein rather than using a payment box, the viewer also has the option of not paying for the content, but by instead viewing an advertisement by an advertisement selecting box.

14. The method of claim 1, wherein the viewing of a video file and the delivery of funds to the content provider is initiated by one of the content provider and the viewer.

15. The method of claim 14, wherein the viewing of a video file and the delivery of funds to the content provider is initiated by the content provider and the viewer, whereby once the viewer selects a view event, a dollar value that will be paid is reported to the content provider, the content provider continues to track the progress of the view event and is notified when the view event completes and the payment has been transferred to a payment-receipt account of the content provider.

16. The method of claim 14, wherein the viewer can initiate the viewing of a video file and the delivery of funds interaction by using a widget or link, whereby the viewer has a payment-receipt account, and when the view event completes, an amount of funds are transferred to the payment-receipt account of the viewer.

17. The method of claim 1, wherein the view event is viewed on one of a cell phone, a smart phone, a tablet, a laptop or other personal computer, or a television set top box.

18. The method of claim 1, wherein an ad is posted by the ad-creator to the database of video files, the ad-creator captures a view event, identifies the product or service in the view event, categorizes the view event and submits the view event for review.

19. The method of claim 18 wherein when a view event is sponsored by an ad-sponsor, the ad-sponsor is notified of the view event matching their preferences, views the view event, sets a budget to sponsor the view event, assigns the view event to one or more categories, and posts the advertising funds.

20. The method of claim 1, wherein the content is viewed at a screen including one of a television, monitor, computer display and cell phone display.

21. The method of claim 1, wherein the content is one of music, applications for a computer or phone, IPTV (Internet Protocol Television) programs, movies or games, among other content available from the content provider.

22. A computer-implemented method of compensating a content provider for providing content to a viewer, comprising the steps of:
creating a video file by an ad-creator using a computing device;
storing the video file into a computer database of video files stored on a system server;
the database of video files being selectively viewable by at least the viewer;
viewing a video file by an ad sponsor;
sponsoring the viewed video file by the ad-sponsor by pledging funds of a selected amount by the ad-sponsor corresponding to the viewed video file;
establishing a payment account for the viewer to receive credit or funds for viewing the sponsored video file;
selecting, by the viewer, an option to pay by viewing the sponsored video file;
viewing the sponsored video file by the viewer to create a view event;
receiving a credit or funds by the viewer for viewing the sponsored video file;
delivering a portion of the pledged funds by the ad-sponsor to the ad creator upon viewing of the view event by the viewer;
selecting the content for purchase by the viewer;
transferring the credit or funds from the payment account of the viewer to the content provider;
whereby, the content provider provides the selected content to the viewer upon receipt of pledged funds from the viewer to the content provider.

23. The method of claim 22 wherein the step of transferring the credit or funds from the payment account of the viewer to the content provider includes alternate options of viewing the sponsored video file by the viewer to create a view event to deliver pledged funds or having the viewer directly pay for the selected content.

24. The method of claim 23 including, before the step of having the viewer select a video payment option, initiating a payment option by the content provider.

25. The method of claim 22, wherein the viewer watches a view event multiple times but can only receive once credit or funds in the form of content from the content provider, for a specific view event watched.

\* \* \* \* \*